US006962365B2

(12) United States Patent
Rink et al.

(10) Patent No.: US 6,962,365 B2
(45) Date of Patent: Nov. 8, 2005

(54) INFLATION GAS GENERATION DEVICES AND METHODS UTILIZING JOULE-THOMSON HEATING

(75) Inventors: Karl K. Rink, Princeton, ID (US); Matthew Scott Johnson, Salt Lake City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 253 days.

(21) Appl. No.: 10/379,054

(22) Filed: Mar. 4, 2003

(65) Prior Publication Data

US 2004/0174007 A1    Sep. 9, 2004

(51) Int. Cl.[7] .............................................. B60R 21/26
(52) U.S. Cl. ........................ 280/736; 280/741; 280/742
(58) Field of Search ................................ 280/741, 736, 280/742

(56) References Cited

U.S. PATENT DOCUMENTS

| | | | |
|---|---|---|---|
| 5,527,066 A | 6/1996 | Svensson | |
| 5,607,181 A | 3/1997 | Richardson et al. | |
| 5,649,720 A | 7/1997 | Rink et al. | |
| 5,669,629 A | 9/1997 | Rink | |
| 5,692,776 A * | 12/1997 | Rink et al. | 280/741 |
| 5,732,972 A * | 3/1998 | Johnson et al. | 280/737 |
| 5,884,938 A | 3/1999 | Rink et al. | |
| 5,941,562 A | 8/1999 | Rink et al. | |

FOREIGN PATENT DOCUMENTS

WO    WO 93/11971    6/1993

OTHER PUBLICATIONS

Elias P. Gyftopoulos and Gian Palo Berletta: *Thermodynamics: Foundations and Applications*, pp. 376-379, Macmillan 1991.
Elias P. Gyftopoulos and Gian Palo Berletta: *Thermodynamics: Foundations and Applications*, pp. 281-303, Macmillan 1991.
*The Extreme Principle in the Legendre Transformed Representations*, pp. 160-167.

* cited by examiner

*Primary Examiner*—Eric Culbreth
(74) *Attorney, Agent, or Firm*—Sally J. Brown

(57) ABSTRACT

The invention provides apparatus for inflating an inflatable safety restraint cushion and associated methods for producing an inflation gas for inflating an inflatable safety restraint cushion which rely, at least in part, on Joule-Thomson heating.

30 Claims, 7 Drawing Sheets

INFLATION GAS GENERATION DEVICES AND METHODS UTILIZING JOULE-THOMSON HEATING

BACKGROUND OF THE INVENTION

This invention relates generally to gas generation and, more particularly, to devices and methods for inflating an inflatable device such as an inflatable vehicle occupant restraint of a respective inflatable restraint system, for example.

It is well known to protect a vehicle occupant using a cushion or bag, e.g., an "airbag cushion," that is inflated or expanded with gas such as when the vehicle encounters a sudden deceleration, such as in the event of a collision. In such systems, the airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

Many types of inflator devices have been disclosed in the art for the inflating of one or more inflatable restraint system airbag cushions. Known forms or types of inflator devices include inflators known as "blowdown" inflators and "reverse flow" inflators. In a blowdown inflation system, a pyrotechnic or other selected material is commonly burned to create a build-up of pressure within a compressed gas storage chamber such as to result in the rupture or release of inflation gas therefrom when the internal pressure reaches a predetermined level or range. Thus, in blowdown inflator devices, the opening or rupture of a seal, burst disk or the like within the inflator typically results or produces a flow of heated or elevated temperature inflation gas from the device and into an associated airbag cushion. While blowdown inflation systems can desirably be of relatively lower cost and complexity, such systems can result in the delivery of inflation gas to an associated airbag cushion at a higher temperature, pressure and/or mass flow rate than may otherwise be required or desired.

In "reverse flow" inflator devices, an actuating initiator and openings wherethough the inflation gas exits from the inflator device are typically at or along the same end or side of the inflator device. Thus, in typical reverse flow inflators, the initial inflation gas exiting from the inflator device and passing into an associated airbag cushion is relatively cool and is later followed by heated or elevated temperature inflation gas. Consequently, reverse flow inflators which initially provide or supply a relatively cool inflation gas, followed by heated or elevated temperature inflation gas to an associated airbag cushion, can typically more easily provide or result in the more gradual deployment of the associated airbag cushion, as may be required or desired in particular deployment applications.

Specific types of prior art inflator devices include compressed stored gas inflators, pyrotechnic inflators and hybrid inflators. Unfortunately, each of these types of inflator devices has been subject to certain disadvantages such as one or more of having a greater than desired weight, requiring more than desired space or volume, producing undesired or nonpreferred combustion products in greater than desired amounts, and producing or emitting gases at a greater than desired temperature, for example.

Modern inflatable restraint system design, manufacture, production and operation has generally been moving in a direction towards or to relatively small, lightweight and economical modern vehicle components and assemblies.

Commonly assigned, Rink, U.S. Pat. No. 5,669,629, issued Sep. 23, 1997; Rink et al., U.S. Pat. No. 5,884,938, issued 23 Mar. 1999; and Rink et al., U.S. Pat. No. 5,941,562, issued 24 Aug. 1999, each generally relates to apparatus for and methods of gas generation which at least in part rely on the decomposition or dissociation of a selected gas source material for gas generation. The disclosures of each these patent is hereby incorporated by reference herein and made a part hereof, including but not limited to those portions which specifically appear hereinafter.

In one form of such recently developed inflator device, inflation gas is produced or formed, at least in part, via the decomposition or dissociation of a selected gas source material, such as in the form of a compressed gas and such as via the input of heat from an associated heat source supply or device. Nitrous oxide is a preferred gas source material specifically disclosed in one or more of these patents. One or more of the above-identified patents disclose that such an apparatus for and method of gas generation can be helpful in one or more of the following respects: reduction or minimization of concerns regarding the handling of content materials; production of relatively low temperature, nonharmful inflation gases; reduction or minimization of size and space requirements and avoidance or minimization of the risks or dangers of the gas producing or forming materials undergoing degradation (thermal or otherwise) over time as the inflator awaits activation.

Nevertheless, further or continued improvements in inflator devices, such as relating to design, manufacture, production and/or operation, are desired.

SUMMARY OF THE INVENTION

A general object of the invention is to provide improved inflation gas generation devices and methods.

A more specific objective of the invention is to overcome one or more of the problems described above.

The general object of the invention can be attained, at least in part, through a specified apparatus for inflating an inflatable safety restraint cushion. In accordance with one preferred embodiment of the invention, such apparatus includes an expansion chamber having fluid contents, an expansion chamber opening device, a Joule-Thomson throttling device situated adjacent to the expansion chamber and a storage chamber situated adjacent to the Joule-Thomson throttling device and opposite the expansion chamber, the storage chamber having contents which include a supply of Joule-Thomson heating material.

Upon opening of the expansion chamber, the Joule-Thomson throttling device permits at least a portion of the supply of the Joule-Thomson heating material to be passed from the storage chamber to the expansion chamber through the Joule-Thomson throttling device with the portion of the supply of the Joule-Thomson heating material passing therethrough undergoing Joule-Thomson heating to form an inflation gas for use in inflating the inflatable safety restraint cushion.

The prior art generally fails to provide inflation apparatus and methods of inflation gas production and supply which have a design, operation or construction which is a simple and as effective as may be desired. Further, the prior art generally fails to provide inflation apparatus and methods of inflation gas production and supply which can provide or result in an inflation gas output which can be adapted to particular or specific inflation applications in a manner as simply and effectively as may be desired. In particular, the prior art generally fails to utilize or employ Joule-Thomson heating in an as advantageous manner as may be desired to one or more simplify, facilitate, and/or improve inflation gas generation to as great an extent as may be desired.

The invention further comprehends a method for producing an inflation gas for inflating an inflatable safety restraint cushion. In accordance with one preferred embodiment of the invention such method involves passing at least a portion of a supply of Joule-Thomson heating material through a Joule-Thomson throttling device whereby the portion of the supply of the Joule-Thomson heating material passing therethrough undergoes Joule-Thomson heating to form an inflation gas for use in inflating the inflatable safety restraint cushion.

As used herein, references to "combustion," "combustion reactions" and the like are to be understood to generally refer to the exothermic reaction of a fuel with an oxidant.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S \quad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Other objects and advantages will be apparent to those skilled in the art from the following detailed description taken in conjunction with the appended claims and drawings.

DETAILED DESCRIPTION OF THE INVENTION

Figure 1:
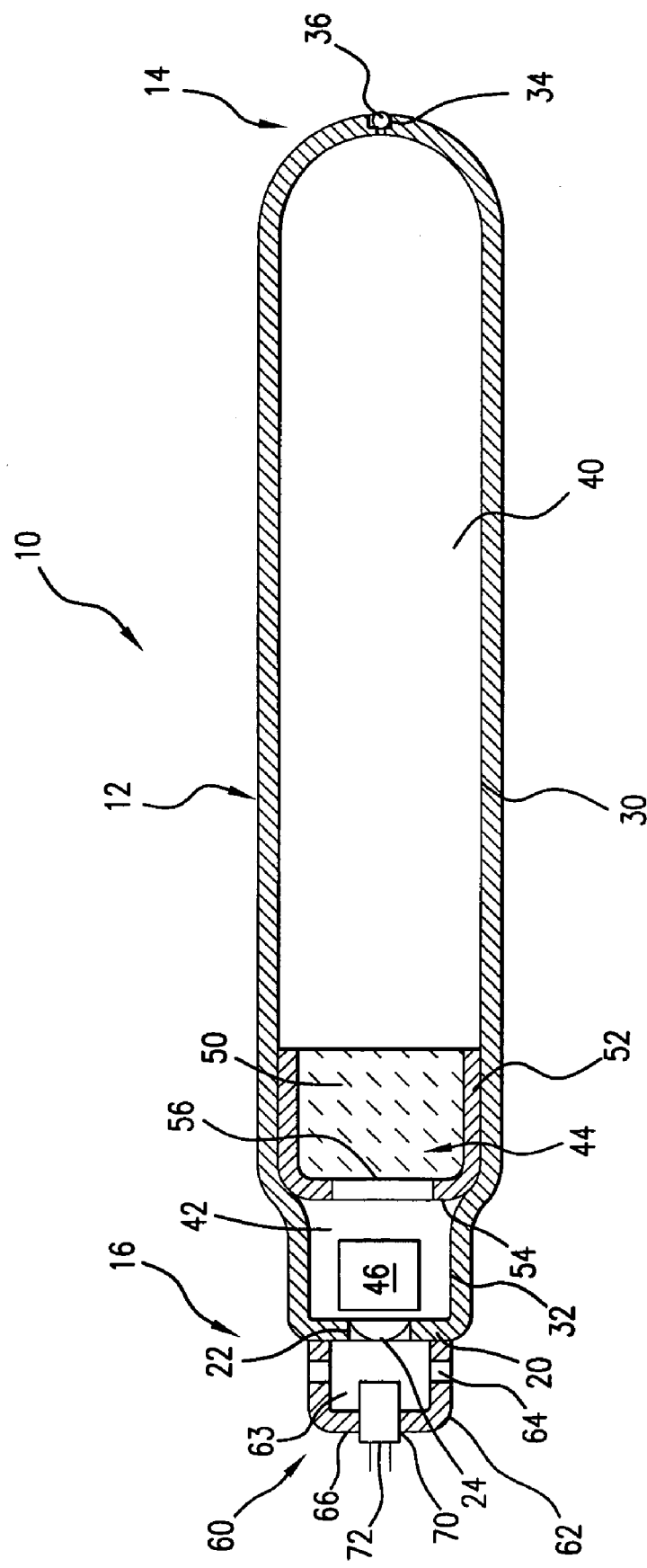
FIG. 1 is a simplified, partially in section, schematic drawing of an airbag inflator in accordance with one embodiment of the invention.

The present invention, as detailed below, provides an improved apparatus for inflating an inflatable device as well as an improved method for supplying a quantity of inflation gas to an inflatable device. The invention may be embodied in a variety of different structures. Referring initially to FIG. 1, there is illustrated an apparatus for inflating an inflatable device, generally designated by the reference numeral 10, in accordance with one preferred embodiment of the invention and such as may be used to inflate an inflatable vehicle occupant restraint, e.g., an inflatable airbag cushion, (not shown). The apparatus 10 is also sometimes referred to hereinafter as an "airbag inflator assembly" or, more simply, as an "inflator."

As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

The invention is described hereinafter with particular reference to an inflator for use in various automotive vehicles including vans, pick-up trucks, and particularly automobiles. As will be appreciated by those skilled in the art, the invention has applicability to various types or kinds of inflation applications such as airbag installations for automotive vehicles including driver, passenger and side impact airbag assemblies and for the inflation of various inflatable devices such as may be apparent to those skilled in the art. Thus, in particular applications such inflation applications may involve the inflation of a driver airbag cushion, a passenger airbag cushion or a side impact airbag cushion such as in the form of an inflatable curtain, for example. Moreover, the invention has applicability with other types of vehicles as well, including airplanes, for example.

The inflator assembly 10 comprises a pressure vessel 12 such as in a generally elongated cylindrical form with opposite first and second ends, 14 and 16, respectively. The first end 14 is rounded and closed, as is common for inflator pressure vessels. The second end 16 is partially closed by an end wall 20. The end wall 20 includes an opening 22 therein. The opening 22 is normally closed by means of a burst disk 24 or the like.

The pressure vessel 12 forms or includes first and second chambers, here designated by the reference numerals 30 and 32, respectively. As described in greater detail below, the first and second chambers 30 and 32 are sometimes hereinafter referred as a storage chamber and an expansion chamber, respectively. As shown, the pressure vessel 12 includes a fill port 34, as is known in the art, wherethrough materials can be passed into the pressure vessel 12. After the pressure vessel 12 has been appropriately filled, the fill port 34 can be appropriately blocked or plugged, as is known, such as by a pin or ball 36. In this illustrated embodiment, the fill port 34 is shown as in flow communication with the storage chamber 30. As will be appreciated, such a fill port, if included in the inflator apparatus, can alternatively be placed or positioned, as may be desired and understood by those skilled in the art. Thus, the broader practice of the invention is not necessarily limited to the inclusion of a fill port or the position or placement thereof.

The storage chamber 30 has contents, designated by the reference numeral 40. As described in greater detail below, the contents 40 include a supply of Joule-Thomson heating material, typically stored or therein contained in a gaseous form. Those skilled in the art and guided by the teachings herein contained will understand and appreciate that in an ideal Joule-Thomson process, material is passed through a Joule-Thomson throttling device without the material undergoing a change in kinetic energy and without the material exchanging heat with the surroundings and, in a manner, sometimes referred to as "constant enthalpy," the material is passed through a Joule-Thomson throttling device such that both the initial and final enthalpies for the material remain the same.

The expansion chamber 32 has contents, designated by the reference numeral 42. As described in greater detail below, the storage chamber 30 and the expansion chamber 32 of the inflator assembly 10 are in fluid communication with each other via a Joule-Thomson throttling device 44. Consequently, the storage chamber contents 40 and the expansion chamber contents 42 are generally the same or similar in their constituents.

If desired and as shown, the expansion chamber 32 may additionally contain or include a heat source, generally designated by the reference numeral 46. The heat source 46 is sometimes referred to herein as an "internal heat source" as this heat source is at least partially if not completely contained within the expansion chamber 32. Those skilled in the art and guided by the teachings herein provided will appreciate that through the inclusion and functioning of such a heat source, the heat content within the expansion chamber 32 can desirably be increased such as may desirably in turn serve to increase the inflation gas output from the inflator assembly 10. Various suitable heat sources, such as known in the art, can be used. For example and not necessarily limiting on the broader practice of the invention, suitable such heat sources for use in the practice of the invention can include an initiator and, if desired, a "booster" pyrotechnic charge, such as of known composition and such as has been used in the art.

Suitable initiators for use in the invention can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be desired or helpful and as pyrotechnic charge-containing initiators can typically more easily produce such relatively large heat inputs from a relatively small sized initiator device, the practice of the invention with such initiators can be particularly advantageous.

In any case, if the initiator is itself incapable of providing the desired heat input, the heat source 46 may additionally contain or include a cup or other form of housing such as containing or housing an additional pyrotechnic charge (sometimes referred to as a "booster") and such as having the heat source initiator in discharge communication therewith.

Many different materials are available and useful as boosters. In general, these booster materials can be classified into two general categories or types: those that are fully- or self-oxidized (i.e., they do not generally require an additionally provided oxidant) and those that are under-oxidized (i.e., they generally require an additionally provided oxidant). Preferred self-oxidized booster materials include boron potassium nitrate ($BKNO_3$) and zirconium potassium perchlorate (ZPP). Ethyl cellulose ($C_{24}H_{46}O_{11}$) is an example of an under-oxidized booster material which can be used in the practice of the invention. It is to be understood, however, that the invention can, if desired, be practiced without the inclusion of an added heat source and certain preferred embodiments of the invention do not include the presence or use of such an added heat source.

As identified above, interposed between the storage chamber 30 and the expansion chamber 32 and as described in greater detail below is the Joule-Thomson throttling device 44. As shown, the Joule-Thomson throttling device 44 is generally situated adjacent to the expansion chamber 32, with the storage chamber 30 situated adjacent relative to the Joule-Thomson throttling device 44, opposite the expansion chamber 32. The Joule-Thomson throttling device 44 is generally composed of a porous plug or a reticulated ceramic or other suitable matrix form, generally designated by the reference numeral 50, which is held or otherwise contained in a retainer 52. The retainer 52 includes a base wall 54 having an opening 56 such as to permit fluid communication therethrough. Such form or type of Joule-Thomson throttling device is currently believed preferred for use in the practice of the invention as such type or form of Joule-Thomson throttling device can desirably avoid the inclusion or reliance on moving parts such as may undesirably complicate operation and hinder performance reliability, both major factors in effective safety restraint design and use.

Suitable such Joule-Thomson throttling devices can be composed of various materials including polymers and copolymers of various organic compounds such as those of synthesized compounds such as aldehydes, ethers, esters, vinyls and amides, for example, as well as and probably to a lesser extent, naturally occurring compounds such as celluloses, saccharides and polysaccharides, for example. Particularly preferred are those of such materials having expanded or porous, low-density forms such as in the nature of foams or sponges. Specific examples of such materials useful in the practice of the invention include polyurethane, polystyrene, polypropylene, polyethylene, polyester and polyamides. Other suitable porous or matrix materials can include dienes, including butadienne, as well as various natural and synthetic rubber compounds and elastomers including neoprene, polyisoprene and copolymers of butadiene and styrene (SBR), for example. A particularly preferred class or family of parent materials useful in the practice of the invention include polysiloxanes.

It will be appreciated that various Joule-Thomson throttling devices, such as either known in the art or apparent to those skilled in the art and guided by the teachings herein provided can be used in the practice of the invention. For a example, a Joule-Thomson throttling device in the form of a valve can, if desired, be used. Thus, while the illustrated embodiment employs a Joule-Thomson throttling device 44 generally composed of a porous plug or a reticulated ceramic or other suitable matrix form 50 held or otherwise contained in a retainer 52, the broader practice of the invention is not necessarily so limited.

Further, those skilled in the art and guided by the teachings herein provided will appreciate that suitable parent, solid materials can be selected such that such porous or matrix material is at least partially and, in accordance with certain preferred embodiments, totally or substantially consumed during operation of the inflator device. As will be appreciated, such partial, substantial or total consumption may be desired such as to boost performance such as by adding heat to the flow alternatively or in addition such consumption of the throttling device may simplify one or more of the manufacture, construction, production or disposal of such inflator devices, as for example with such total or substantial combustion, no significant remainder or residue of the solid will remain within the used inflator device, e.g., remain within the inflator device after such inflator device has been operated such as to provide or supply inflation gas.

It is also to be appreciated that the relative volume and thus the relative amounts of the contents 40 and 42, respectively, of each of the storage and expansion chambers, 30 and 32, respectively, in inflator assemblies in accordance with the invention can be simply adjusted by or through the placement or positioning of the physical boundary therebetween and such as formed by the Joule-Thomson throttling device 44. For example, to increase the relative volume of the expansion chamber 32 as compared to the volume of the storage chamber 30, the Joule-Thomson throttling device 44 can be appropriately positioned and placed within the pressure vessel 12. In particular, the Joule-Thomson throttling device 44 can be positioned nearer the pressure vessel closed end 14, for example. Similarly, to decrease the relative volume of the expansion chamber 32 as compared to the volume of the storage chamber 30, the Joule-Thomson throttling device 44 can be positioned nearer the pressure vessel end 16, for example. In the illustrated embodiment, the shown location or placement of the Joule-Thomson throttling device 44 will generally dictate that most all the gas which exits from the inflator assembly 10 will have passed through the Joule-Thomson throttling device 44.

As identified above, Joule-Thomson heating materials for use in the practice of the invention are materials with which Joule-Thomson-heating is realized when passed through a Joule-Thomson throttling device. Preferred Joule-Thomson heating materials for use in the practice of the invention include helium, hydrogen gas ($H_2$), oxygen, argon, nitrogen, neon, xenon, $SF_6$, carbon monoxide, ammonia, hydrocarbon fuels and mixtures thereof. Particularly preferred Joule-Thomson heating materials for use in the practice of the invention include helium, hydrogen gas ($H_2$), and mixtures thereof.

In practice, the storage chamber contents 40 are desirably stored or therein contained at a static pressure of at least 2500 psi (17.2 MPa) and no more than 15,000 psi (103.4 MPa). Preferably, the storage chamber contents 40 are stored or therein contained at a static pressure of at least 3000 psi (20.7 MPa) and no more than 10,000 psi (68.9 MPa). More preferably, the storage chamber contents 40 are stored or therein contained at a static pressure of at least 4000 psi (27.6 MPa) and no more than 7,500 psi (51.7 MPa)

In practice, the storage chamber contents 40 are desirably stored or therein contained at an equivalence ratio of no more than 1.2. In accordance with some embodiments of the invention, the storage chamber contents 40 are desirably stored or therein contained at an equivalence ratio of at least 0.05. In accordance with certain preferred embodiments of the invention, the storage chamber contents 40 are preferably stored or therein contained at an equivalence ratio of at least 0.25 and no more than 1. In accordance with certain particularly preferred embodiments of the invention, the storage chamber contents 40 are preferably stored or therein contained at an equivalence ratio of at least 0.4 and no more than 0.8.

The inflator assembly 10 also includes a diffuser assembly 60 such as formed or included adjacent the expansion chamber 32. The diffuser assembly 60 includes a cylindrical sleeve 62 and, at least in part, defines a diffuser chamber 63. The cylindrical sleeve 62 includes a plurality of outlet openings 64 such as wherethrough inflation gas can be properly dispensed into an associated inflatable airbag cushion (not shown). The diffuser assembly 60 also includes a base wall 66. The base wall 66 includes an opening 70 wherethrough a suitable chamber opener 72, such as described in greater detail below, is attached in sealing relation. As will be appreciated, such attachment can be effected by various appropriate means such as with a weld, crimp or other suitable seal, for example.

In accordance with particular preferred embodiments of the invention, suitable chamber opening devices for use in the practice of the invention can take the form of an initiator device such as known for inclusion in inflator devices and for use in rupturing burst disks or the like to effect opening of a chamber therebehind enclosed. Particular initiator devices for use in the practice of the invention can include any suitable type of initiator means including: bridgewire, spark-discharge, heated or exploding wire or foil, through bulkhead (e.g., an initiator which discharges through a bulkhead such as in the form of a metal hermetic seal), for example, and such as may be effective to initiate reaction of an associated pyrotechnic charge. In practice, initiator device forms of chamber openers typically effect the rupture or otherwise open an associated burst disk via a discharge of pressure, heat or other form of energy thereagainst and do not rely on the exertion of a direct mechanical contact against the burst disk.

In accordance with alternate preferred embodiments of the invention, suitable chamber opener devices for use in the practice of the invention can take the form of a mechanical opener such as having the form or including a projectile or the like. In practice, upon actuation of such mechanical openers, the projectile or the like is typically thrust or otherwise directed against an associated burst disk to effect the rupture or opening thereof.

As will be appreciated, the inflation gas issuing forth from the inflator assembly 10 will desirably be a warm gas as compared to a gas that has not undergone Joule-Thomson heating in accordance with the invention. Further, such an inflator assembly, particularly if not requiring or otherwise including an added heat source, such as the internal heat source 46, is of relatively simple design and operation.

Operation

Typical operation of the inflator assembly 10, shown in FIG. 1, is as follows:

Upon the sensing of a collision, an electrical signal is sent to the expansion chamber opener device 72, such as described above. The expansion chamber opener device 72 functions and produces a discharge directed towards the burst disk 24 to result in the rupture or otherwise opening thereof. Consequently, the expansion chamber contents 42 are permitted to begin to pass through the opening 22 into the diffuser chamber 63 and thus allows this inflation gas to exit through the diffuser orifices or outlet openings 64 into an associated airbag assembly (not shown).

As the expansion chamber contents 42 exit into the diffuser chamber 63, the storage chamber contents 40 begin to pass through the Joule-Thomson throttling device 44 and out, though the opening 56 in the retainer 52, into the expansion chamber 32. As will be appreciated, such passage and resulting gas expansion will result in the generation of heat, e.g., Joule-Thomson heating, and thus a heating of the expanding gas.

As shown, such Joule-Thomson heating, if desired, can be augmented or supplemented via operation of the internal heat source 46 to produce or otherwise provide or supply additional heat to the gas on its passage through the expansion chamber 32 and out through the diffuser chamber 63. For example, if such internal heat source 46 contains or includes a supplemental pyrotechnic material, such supplemental pyrotechnic material can be initiated via residual heat resulting from operation of an initiator form of chamber opener 72 or via mechanical initiation in the case of a mechanical form of chamber opener 72. It will be appreciated that in such an arrangement, such a supplemental pyrotechnic heat source material can desirably increase the heat content within the expansion chamber 32 due to the affect of the Joule-Thomson-heated gas flowing over the surface thereof. As will also be appreciated, embodiments which do not utilize or employ such supplemental heating will typically be characterized by an exit or product gas having a lower temperature.

As will be appreciated by those skilled in the art and guided by the teachings herein provided, design parameters such as the size, e.g., diameter, of the pressure vessel opening 22 can be appropriately selected and designed such as to allow or permit a desired mass flow rate of material therethrough and thus desired heating of the gas prior to passage into the diffuser chamber 63.

Figure 2:
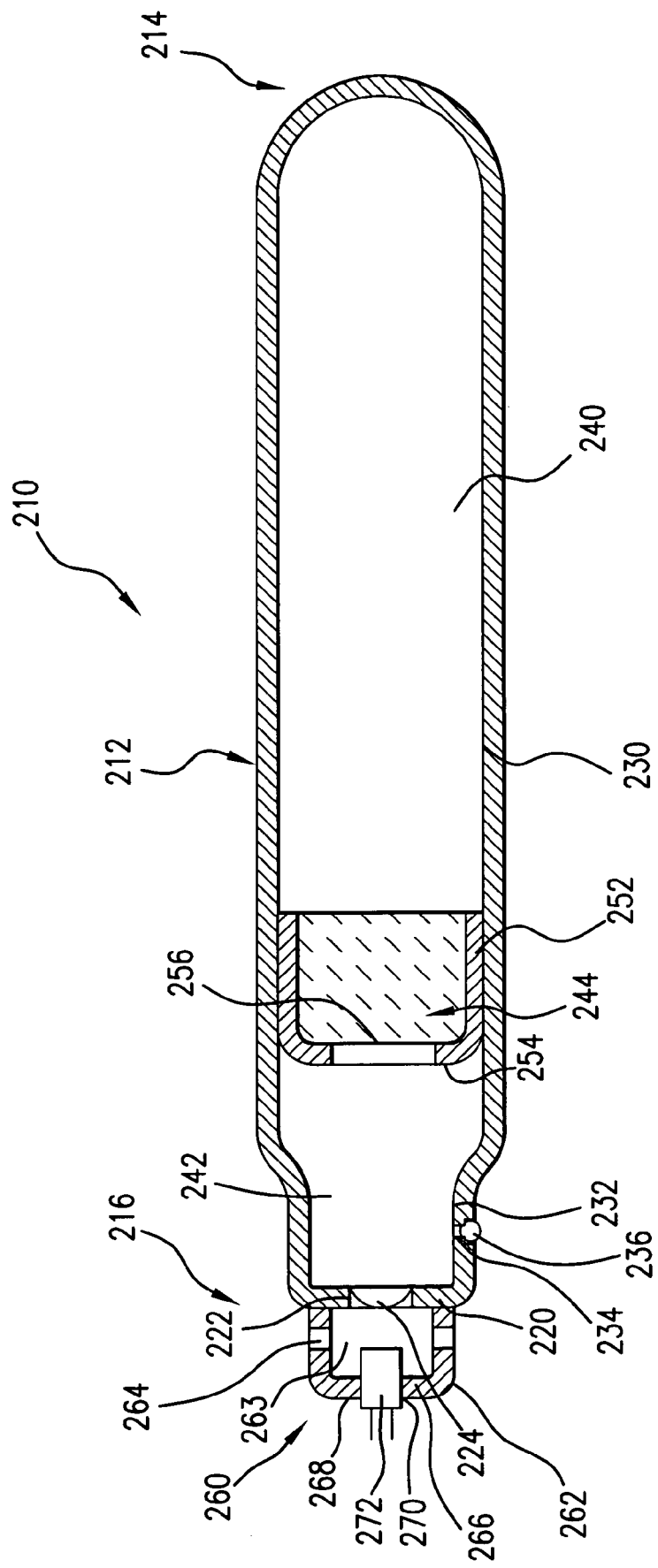
FIG. 2 is a simplified, partially in section, schematic drawing of an airbag inflator in accordance with an alternative embodiment of the invention.

FIG. 2 illustrates a special embodiment of an inflator assembly, generally designated by the reference numeral 210, in accordance with the invention.

The inflator assembly 210 is generally similar to the inflator assembly 10 described above in that it similarly includes a generally elongated cylindrical form pressure vessel 212 with opposite first and second ends, 214 and 216, respectively. The first end 214 is rounded and closed. The second end 216 is partially closed by an end wall 220. The end wall 220 includes an opening 222 therein. The opening 222 is normally closed by means of a burst disk 224 or the like.

The pressure vessel 212 forms or includes first and second chambers, here designated by the reference numerals 230 and 232, respectively. As in the above, described embodiments, the first and second chambers 230 and 232 are sometimes hereinafter referred as a storage chamber and an expansion chamber, respectively.

The pressure vessel 212 also includes a fill port 234, as is known in the art, wherethrough materials can be passed into the pressure vessel 212. In this illustrated embodiment, the fill port 234 is shown as in flow communication with the expansion chamber 232. Similar to the embodiment described above, after the pressure vessel 212 has been appropriately filled, the fill port 234 can be appropriately blocked or plugged, as is known, such as by a pin or ball 236.

The storage chamber 230 has contents, designated by the reference numeral 240. The storage chamber contents 240 include a supply of Joule-Thomson heating material, as herein described and typically stored or therein contained in a gaseous form. The expansion chamber 232 has contents, designated by the reference numeral 242. Also, as in the inflator assembly 10, the storage chamber 230 and the expansion chamber 232 are in fluid communication with each other via a Joule-Thomson throttling device 244, such as described above. Consequently, the storage chamber contents 232 and the expansion chamber contents 242 are generally the same or similar in their constituents.

In particular, the Joule-Thomson throttling device 244 is interposed between the storage chamber 230 and the expansion chamber 232 as in the above-described embodiment. The Joule-Thomson throttling device 244 is similarly held or otherwise contained in a retainer 252 such as includes a base wall 254 having an opening 256 such as to permit fluid communication therethrough.

The inflator assembly 210 further includes a diffuser assembly 260 such as similar to the diffuser assembly 60 described above. Thus, the diffuser assembly 260 includes a cylindrical sleeve 262 and, at least in part, defines a diffuser chamber 263. The cylindrical sleeve 262 includes a plurality of outlet openings 264 such as wherethrough inflation gas can be properly dispensed into an associated inflatable airbag cushion (not shown). The diffuser assembly 260 also includes a base wall 266. The base wall 266 includes an opening 270 wherethrough a suitable chamber opener 272, such as described above is joined or otherwise appropriately attached.

The inflator assembly 210 primarily differs from the inflator assembly 10 in that the contents 240 and 242 of the storage chamber 230 and the expansion chamber 232, respectively, is a combustible mixture. Those skilled in the art and guided by the teachings herein provided will appreciate that various suitable combustible mixtures, such as of the materials described above, can be used in the practice of the invention. In particular, combustible mixtures such as include molecular hydrogen, such in the role of a fuel, and particularly such combustible mixtures that include molecular hydrogen, oxygen and/or nitrous oxide and may, if desired, include one or more inert gases such either or both argon and helium, appear to be an especially attractive combustible mixture for use in such applications.

In accordance with the preferred practice of such embodiment, the inclusion of the Joule-Thomson throttling device 244 can desirably serve to prevent or avoid the occurrence of the combustion reaction upstream thereof such that combustion preferably occurs within the expansion chamber 232.

In accordance with certain preferred embodiments of the invention, reaction initiation of the combustible mixture is desirably achieved or induced through Joule-Thomson heating of the mixture or particular components thereof. Such autoignition of a combustible mixture due to Joule-Thomson heating alone is believed to be particularly feasible in connection with those combustible mixtures having a relatively high equivalence ratio, such as an equivalence ratio of at least about 0.8 and no more than about 1.1.

In practice, however, such embodiments may not be generally preferred as, for example, the temperature of the gas exiting the inflator device may be undesirably high. Thus, in accordance with another preferred embodiment of the invention, discharge products from operation of the chamber opener 272, such as residual heat in the case of a chamber opener in the form of a pyrotechnic-including initiator, may cause or result in ignition of the heated mixture once it has passed through the Joule-Thomson throttling device 244. In such operation, combustible mixtures having an equivalence ratio in the range of at least about 0.6 and no more than about 0.8 can be used.

As will be appreciated by those skilled in the art and guided by the teachings herein provided, the positioning or placement of the Joule-Thomson throttling device 244 and the associated retainer 252 within the pressure vessel 212 can be adjusted or selected such as to alter the relative volumes of the storage chamber 230 and the expansion chamber 232, as may be desired in particular applications. Thus, as shown in FIG. 2, the Joule-Thomson throttling device 244 and the associated retainer 252 are shown as positioned nearer the closed first end 214 of the pressure vessel 212 as compared to the arrangement shown in FIG. 1 thus resulting in the inflator assembly 210 having a relatively larger expansion chamber and a relatively smaller storage chamber as compared to the inflator assembly 10, shown in FIG. 1. As will be further appreciated by those skilled in the art and guided by the teachings herein provided, the relative sizes of the expansion chamber and the storage chamber in inflator assemblies in accordance with the invention afford another possible avenue for control of the performance resulting from such an inflator assembly. In particular, larger or smaller expansion chambers will generally allow corresponding less or more, respectively, material to pass through the Joule-Thomson throttling device.

Operation

Typical operation of the inflator assembly 210, shown in FIG. 2, is as follows:

Upon the sensing of a collision, an electrical signal is sent to the expansion chamber opener device 272, such as described above. The expansion chamber opener device 272 functions and produces a discharge directed towards the burst disk 224 to result in the rupture or otherwise opening thereof. Consequently, the expansion chamber contents 242 are permitted to begin to pass through the opening 222 into the diffuser chamber 263 and thus allows this inflation gas to exit through the diffuser orifices or outlet openings 264 into an associated airbag assembly (not shown).

As the expansion chamber contents 242 exit into the diffuser chamber 263, the storage chamber contents 240 begin to pass through the Joule-Thomson throttling device 244 and out, though the opening 256 in the retainer 252, into the expansion chamber 232. As will be appreciated, such passage and resulting gas expansion will result in the generation of heat, e.g., Joule-Thomson heating, and thus a heating of the expanding gas.

As described above, such heating may, in particular embodiments, be sufficient to result or otherwise produce an autoignition of the combustible mixture. In other embodiments, discharge products from operation of the chamber opener 272, such as residual heat in the case of a chamber opener in the form of a pyrotechnic-including initiator, may cause or result in ignition of the heated mixture once it has passed through the Joule-Thomson throttling device 244. In either case, resulting heat and/or additional gaseous products may be used to augment or supplement the inflation gas passing into an associated airbag assembly.

While the invention has been described above with reference to specific embodiments wherein the composition and storage conditions of the contents of the storage chamber and the expansion chamber are similar or the same as the contents of each such chamber are normally in fluid communication with each other, it will be appreciated that the broader practice of the invention is not necessarily so limited. For example, certain preferred embodiments incorporate or utilize contents of different composition in each of the store chamber and the expansion chamber, different storage conditions in each of the store chamber and the expansion chamber, or both contents of different composition as well as different storage conditions in each of the store chamber and the expansion chamber.

Figure 3:
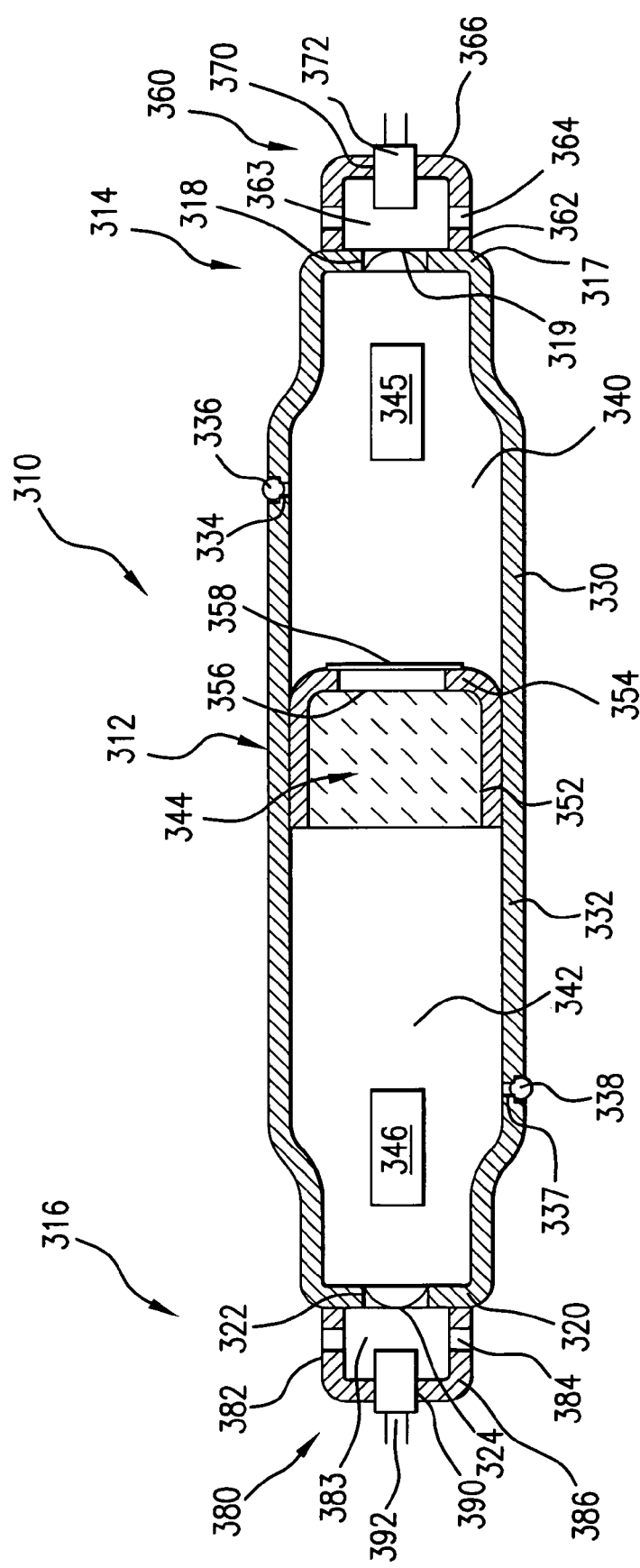
FIG. 3 is a simplified, partially in section, schematic drawing of an airbag inflator in accordance with another alternative embodiment of the invention.

Turning now to FIG. 3, there is illustrated an inflator assembly, generally designated by the reference numeral 310, in accordance with one such other preferred embodiment of the invention.

The inflator assembly 310 comprises a pressure vessel 312 such as in a generally elongated cylindrical form with opposite first and second ends, 314 and 316, respectively. The first end 314 is partially closed by an end wall 317. The end wall 317 includes an opening 318 therein. The opening 318 is closed by means of a burst disk 319. Similarly, the second end 316 is partially closed by an end wall 320. The end wall 320 includes an opening 322 therein. The opening 322 is normally closed by means of a burst disk 324 or the like.

The pressure vessel 312 of the inflator assembly 310, similar to the above-described embodiments, forms or includes a first and second chambers, here designated by the reference numerals 330 and 332, respectively. In this embodiment, as described in greater detail below, the contents of each of the chambers 330 and 332 are kept separated when and while the inflator assembly 310 is in its normal or static, i.e., pre-actuation, state or condition. Thus, the pressure vessel 312 includes a first fill port 334, such as is known in the art, wherethrough materials can be passed into the first chamber 330. As described above, the first fill port 334 can be appropriately blocked or plugged, as is known, such as by a pin or ball 336, after the first chamber 330 has been appropriately filled. The pressure vessel 312 includes a second fill port 337, wherethrough materials can be passed into the second chamber 332. The second fill port 337 can similarly be appropriately blocked or plugged, as is known, such as by a pin or ball 338, after the second chamber 332 has been appropriately filled.

The first chamber 330 has contents, designated by the reference numeral 340 and the second chamber 332 has contents, designated by the reference numeral 342. As in the above-described embodiments, a Joule-Thomson throttling device, here designated by the reference numeral 344, is interposed between the first chamber 330 and the second chamber 332.

The Joule-Thomson throttling device 344 is held or otherwise contained in a retainer 352 such as includes a base wall 354 having an opening 356 therein. The opening 356 is normally closed by means of a burst disk 358 or the like. As will be appreciated the presence and inclusion of such a burst disk or other closer element is generally effective to normally prevent fluid communication through the opening 356 and thus prevent fluid communication between the first and second chambers, 330 and 332, respectively.

In accordance with the invention, at least the second chamber contents 342 includes a supply of Joule-Thomson heating material, as herein described and typically stored or therein contained in a selected fluid form i.e., gaseous, liquid, or multi-phase form (i.e., a partially liquid and partially gaseous mixture). The first chamber contents 340 can be any inflation gas source material effective upon release from the inflator assembly 310 to desirably produce or form an inflation gas medium such as used in the inflation of an inflatable vehicle occupant restraint. In accordance with certain preferred embodiments, each of the first chamber contents 340 and the second chamber contents 342 desirably includes a supply of Joule-Thomson heating material as herein described.

The inflator assembly 310 also includes a first diffuser assembly 360 such as formed or included adjacent the first chamber 330. The first diffuser assembly 360 includes a cylindrical sleeve 362 and, at least in part, defines a first diffuser chamber 363. The cylindrical sleeve 362 includes a plurality of outlet openings 364 such as wherethrough inflation gas can be properly dispensed into an associated inflatable airbag cushion (not shown). The first diffuser assembly 360 also includes a base wall 366. The base wall 366 includes an opening 370 wherethrough a suitable first chamber opener 372, such as a chamber opener as described above, is attached in sealing relation. As will be appreciated, such attachment can be effected by various appropriate means such as with a weld, crimp or other suitable seal, for example.

As will be appreciated, such an inflator assembly can be operated such that upon the sensing of a collision, an electrical signal is sent to the chamber opener 372. The chamber opener 372 functions and produces a discharge directed towards the burst disk 319 to result in the rupture or otherwise opening thereof. Consequently, the first chamber contents 340 are permitted to begin to pass through the opening 318 into the diffuser chamber 363 and thus allows a relatively cold inflation gas to exit through the diffuser orifices or outlet openings 364 into an associated airbag assembly (not shown).

As the first chamber contents 340 exit into the diffuser chamber 363, the pressure within the first chamber 330 begins to decrease such that the burst disk 358 eventually fails allowing gas to flow from the second chamber 332 through the Joule-Thomson throttling device 344 into the first chamber 330 and exit from the inflator assembly 310 via the outlet opening 364. With the passage of this gas through the Joule-Thomson throttling device 344 and as described above, the gas is warmed. Consequently such an arrangement can desirably initially provide a relatively cold inflation gas followed by a relatively warm inflation gas. As will be appreciated, such an arrangement and operation can permit the attaining of sustained inflation pressures such as may be particularly desired for certain applications such as in connection with inflatable restraint devices employed to provide rollover protection. Thus, one particularly attractive application of such an inflator assembly is in connection with inflatable restraint devices such as in the form of inflatable curtains wherein a sustained inflation pressure and consequent sustained inflated condition or state is generally desired or preferred in order to provide protection over the extended time period of a rollover incident.

If desired and as shown, the first chamber 330 may additionally contain or include a heat source 345 such as described above relative to the embodiment illustrated in FIG. 1. The heat source 345 is sometimes referred to herein as an "internal heat source" as such heat source is at least partially if not completely contained within the first chamber 330. Those skilled in the art and guided by the teachings herein provided will appreciate that through the inclusion and functioning of such a heat source, the heat content within the first chamber 330 can desirably be increased such as may desirably in turn serve to increase the inflation gas output from the inflator assembly 310. More particularly, the inclusion and actuation of such a heat source can desirably provide a higher output of the gas first released from the inflator assembly 310.

The inflator assembly 310 may, as shown, include a second diffuser assembly 380 such as formed or included adjacent the second chamber 332. The second diffuser assembly 380 includes a cylindrical sleeve 382 and, at least in part, defines a second diffuser chamber 383. The cylindrical sleeve 382 includes a plurality of outlet openings 384 such as wherethrough inflation gas can be properly dispensed into an associated inflatable airbag cushion (not shown). The second diffuser assembly 380 also includes a base wall 386. The base wall 386 includes an opening 390 wherethrough a suitable second chamber opener 392, such as a chamber opener as described above, is attached in sealing relation.

With the inclusion of such a second chamber opener 392 various additional modes of operation can, if desired, be realized. For example, an electrical signal can be sent to the second chamber opener 392 resulting in functioning thereof and the rupture or opening of the burst disk 324. Consequently, the second chamber contents 342 are permitted to begin to pass through the opening 322 into the diffuser chamber 383 and thus allows a relatively cold inflation gas to exit through the diffuser orifices or outlet openings 384 into an associated airbag assembly (not shown). Further, the retainer 352, either alone or together with the Joule-Thomson throttling device 344 can desirably serve to provide support to the burst disk 358 such as to avoid or prevent the failure of the disk 358 even after the partial or substantial release of the second chamber contents 342 from the inflator assembly 310 such as in the event of an application in which the second chamber opener 392 and not the first chamber opener 372 is actuated or in the event that the second chamber opener 392 is actuated and operated substantially prior to the actuation and operation of the first chamber opener 372.

Further, there may be instances where it may be desired that the first and second chambers 330 and 332 both be opened, such as simultaneously, sequentially or with a desired time lag between the opening of thereof. Those skilled in the art and guided by the teachings herein provided will appreciate that in operation the specific desired timing of the opening events will be typically be determined by one or more factors such as related to the specific form or type of gas in each of the chambers, the initial pressures within each of the chambers as well as the desired inflation gas output from the inflator assembly.

Further, if desired and as shown the second chamber 332 may, if desired, contain or include a heat source 346, such as of the form or type described above and such as may upon operation serve to increase the heat content within the second chamber 332.

As will be appreciated from the above discussion, such an inflator assembly is truly adaptable as many different performance or output levels can be realized therewith. For example, the mass and or number of moles of inflation medium (e.g., inflation gas) issuing forth therefrom can be changed through actuation of either or both of the chamber openers 372 and 392. Also, the amount of heat, and therefore the inflation pressure, can be varied by through the selection and use of an appropriate Joule-Thomson heating material, as described above, and through the selective incorporation and use of a selected internal heat source in either or both the first and second chambers, 330 and 332, respectively.

For example, in one particularly advantageous combination the first chamber 330 has contents 340 which include a compressed, liquified gas and such as released from the inflator assembly 310 by the firing of the chamber opener 372. This released gas would not undergo any Joule-Thomson heating and would not be heated by action of any internal heat source. As a result, this initial inflation gas output would be low, such as due to this inflation gas being cold. At a subsequent point in time, such after the passage of 20 milliseconds, for example, the burst disk 358 ruptures or otherwise fails causing a Joule-Thomson heating material, such as helium, to flow from the second chamber 332, through the Joule-Thomson device 344 and resulting in the Joule-Thomson heating thereof. This Joule-Thomson heated gas flows into the first chamber 330 and subsequently out of the inflator assembly 310 into the associated inflatable restraint device. Thus, at least a slightly higher pressure is realized as a result of this higher temperature gas. Should an even greater pressure be desired or required, such enhanced performance can be realized by appropriately firing the second chamber opener 392. For example, where that second chamber opener 392 is in the form of a pyrotechnic-containing initiator, the firing thereof can greatly enhance the pressure output via the additional input of heat therefrom.

It will be appreciated that as the inflator assembly 310 has been described above with reference to the incorporation of a chamber opener for each of the first and second chambers 330 and 332, respectively, and such as may be desired in various adaptive inflation applications, the designation of a "storage chamber" and an "expansion chamber" has not here been applied.

Figure 4:
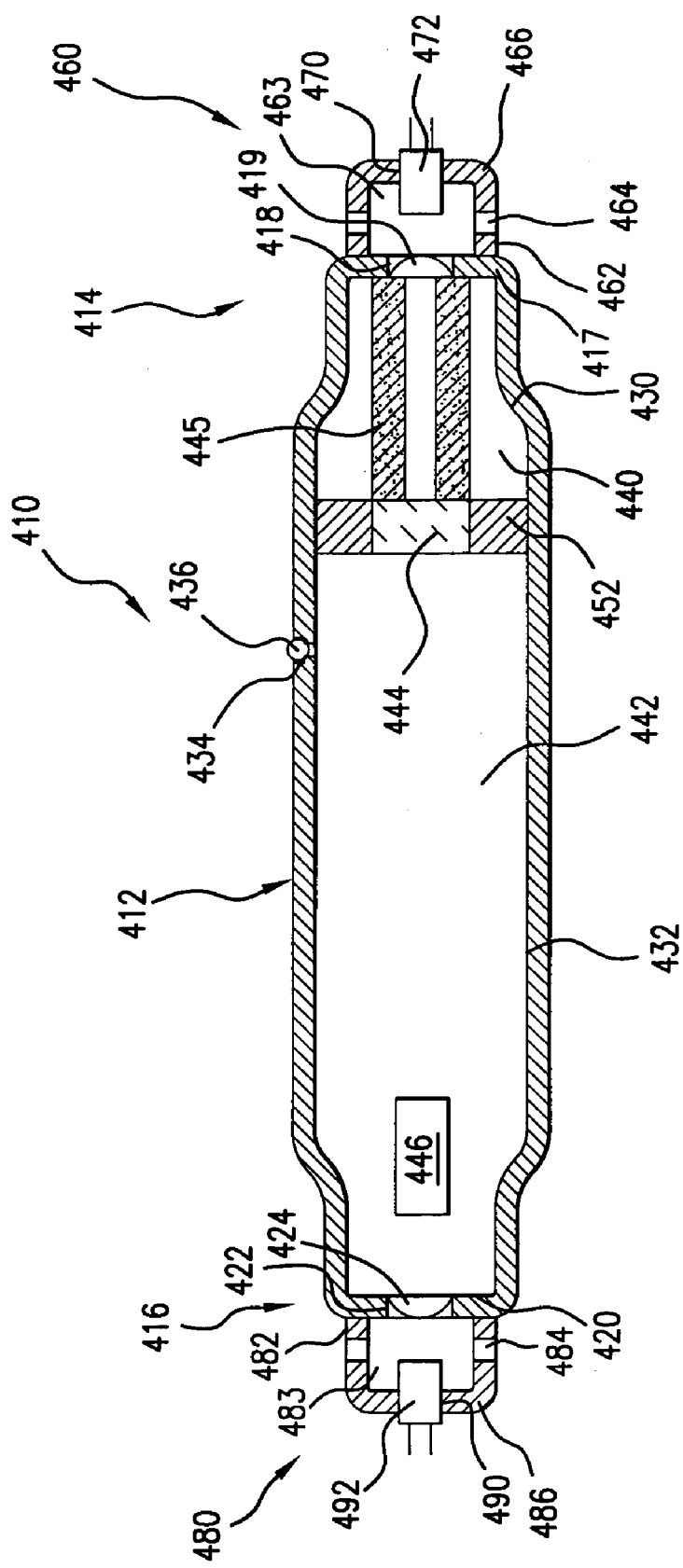
FIG. 4 is a simplified, partially in section, schematic drawing of an airbag inflator in accordance with yet still another alternative embodiment of the invention.

As will be appreciated by those skilled in the art and guided by the teachings herein provided, adaptive inflator assemblies in accordance with the invention can assume various specific forms. For example, FIG. 4 illustrates an inflator assembly, generally designated by the reference numeral 410, in accordance with another embodiment of the invention. The inflator assembly 410 is somewhat similar to the inflator assembly 310 described above in that the inflator assembly 410 includes a pressure vessel 412 such as in a generally elongated cylindrical form with opposite first and second ends, 414 and 416, respectively. The first end 414 is partially closed by an end wall 417. The end wall 417 includes an opening 418 therein. The opening 418 is closed by means of a burst disk 419. Similarly, the second end 416 is partially closed by an end wall 420. The end wall 420 includes an opening 422 therein. The opening 422 is normally closed by means of a burst disk 424 or the like.

The pressure vessel 412 of the inflator assembly 410, similar to the above-described embodiments, forms or includes a first and second chambers, here designated by the reference numerals 430 and 432, respectively. The pressure vessel 412 includes a fill port 434, such as is known in the art, wherethrough materials can be passed into the vessel 412. As described above, the fill port 434 can be appropriately blocked or plugged, as is known, such as by a pin or ball 436, after the vessel 412 has been appropriately filled.

The first chamber 430 has contents, designated by the reference numeral 440 and such as described above.

The second chamber 432 has contents, designated by the reference numeral 442. As in earlier described embodiments, the first chamber 430 and the second chamber 432 of the inflator assembly 410 are in fluid communication with each other via a Joule-Thomson throttling device 444, such as described above. In accordance with one preferred embodiment of the invention, such Joule-Thomson throttling device is desirably in the form of a porous plug or the like. Consequently, the first chamber contents 440 and the second chamber contents 442 are generally the same or similar in their constituents.

The Joule-Thomson throttling device 444 is held or otherwise contained in position between the first and second chambers 430 and 432, by means of a bulkhead form of retainer, designated by the reference numeral 452.

In the inflator assembly 410, the first chamber 430 houses or contains an extruded grain pyrotechnic, such as known in the art and here designated by the reference numeral 445.

Further, if desired and as shown the second chamber 432 may, if desired, contain or include a heat source 446, such as of the form or type described above and such as may upon operation serve to increase the heat content within the second chamber 432.

The inflator assembly 410 also includes a first diffuser assembly 460 such as formed or included adjacent the chamber 430. The first diffuser assembly 460 includes a cylindrical sleeve 462 and, at least in part, defines a first diffuser chamber 463. The cylindrical sleeve 462 includes a plurality of outlet openings 464 such as wherethrough inflation gas can be properly dispensed into an associated inflatable airbag cushion (not shown). The first diffuser assembly 460 also includes a base wall 466. The base wall 466 includes an opening 470 wherethrough a suitable first chamber opener 472, such as a chamber opener as described above, is attached in sealing relation. As will be appreciated, such attachment can be effected by various appropriate means such as with a weld, crimp or other suitable seal, for example.

The inflator assembly 410 may, as shown, include a second diffuser assembly 480 such as formed or included adjacent the second chamber 432. The second diffuser assembly 480 includes a cylindrical sleeve 482 and defines, at least in part, a second diffuser chamber 483. The cylindrical sleeve 482 includes a plurality of outlet openings 484 such as wherethrough inflation gas can be properly dispensed into an associated inflatable airbag cushion (not shown). The second diffuser assembly 480 also includes a base wall 486. The base wall 486 includes an opening 490 wherethrough a suitable second chamber opener 492, such as a chamber opener as described above, is attached in sealing relation.

With such an inflator assembly, again many different inflation outputs can be realized via an assembly that employs a single pressure vessel.

For example, in one mode of operation such as upon the sensing of a collision, an electrical signal is sent to the first chamber opener device 472, such as described above. The first chamber opener device 472 functions and produces a discharge directed towards the burst disk 419 to result in the rupture or otherwise opening thereof. Consequently, the first chamber contents 440 are permitted to begin to pass through the opening 418 into the diffuser chamber 463 and thus allows this inflation gas to exit through the diffuser orifices or outlet openings 464 into an associated airbag assembly (not shown). As the first chamber contents 442 exit into the diffuser chamber 463, the second chamber contents 442 begin to pass through the Joule-Thomson throttling device 444 and out into the first chamber 430. As will be appreciated, such passage and resulting gas expansion will result in the generation of heat, e.g., Joule-Thomson heating, and thus a heating of the expanding gas. As this Joule-Thomson heated gas is passed over the surface of the extruded grain pyrotechnic 445, the burn rate of the pyrotechnic will typically greatly accelerate as the burn rate of such materials is generally temperature dependent.

In another mode of operation, such as upon the sensing of the occurrence of an appropriate collision, an electrical signal is sent to the second chamber opener device 492. The chamber opener device 492 functions and produces a discharge directed towards the burst disk 424 to result in the rupture or otherwise opening thereof. Consequently, the second chamber contents 442 are permitted to begin to pass through the opening 422 into the diffuser chamber 483 and thus allows this inflation gas to exit through the diffuser orifices or outlet openings 484 into an associated airbag assembly (not shown). While such inflation gas initially exiting through the diffuser orifices or outlet openings 484 is a cold or unheated gas, the following gas can desirably be heated by the internal heat source 446 such as to be a heated gas. Thus such operation will generally correspond with the performance response normally associated with typical hybrid forms of vehicular passive restraint inflator devices.

In still another mode of operation, such as where a still higher level of performance is desired or required, such as involving higher or more immediate inflation pressure requirements, both chamber opener devices 472 and 492 can be actuated such as to increase the rise rate and the inflation pressure.

It will be appreciated that the inflator assembly 410, similar to the inflator assembly 310, has been described above with reference to the incorporation of a chamber opener for each of the first and second chambers, such as may be desired in various adaptive inflation applications. In view thereof, the designation of a "storage chamber" and an "expansion chamber" has not here been applied.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

The invention is based, at least in part, on an extension of a phenomenon derived from thermodynamics termed the Joule-Thomson effect. While the details of the Joule-Thomson effect are beyond the scope of the discussion herein provided, a discussion of at least a few of the basic relations therein involved are believed helpful in realizing a more complete understanding the invention and the contemplated applications thereof.

Given the proper conditions, such as described herein, Joule-Thomson heating (or cooling) can occur upon the expansion of subject Joule-Thomson medium (e.g., a gas or gas mixture). As identified above, in an ideal Joule-Thomson process, the medium is passed through a Joule-Thomson throttling device without the medium undergoing a change in kinetic energy, does not exchange heat with the surroundings and, in a manner, sometimes referred to as "constant enthalpy," wherein both the initial and final enthalpies for the medium remain the same. The mathematical relationship defining the Joule-Thomson process can be expressed as:

$$dT=(v/C_p)(Ta-1)dP \qquad (2)$$

where,
dT=temperature change,
v=specific volume,
$C_p$=specific heat,
T=temperature,
a=coefficient of thermal expansion, and
dP=pressure change.

The value of Ta in the above equation (2) is sometimes termed or referred to as the "Joule-Thomson coefficient." If the value of Ta is less than 1, the temperature of the medium will increase upon the expansion thereof (dP<1). On the other hand, if Ta>1, the medium will cool upon expansion. Because the sign of the Ta value is indicative of whether heating or cooling will occur, the value at which Ta=1 is oftentimes called or referred to hereinafter as the "inversion temperature."

Figure 5:
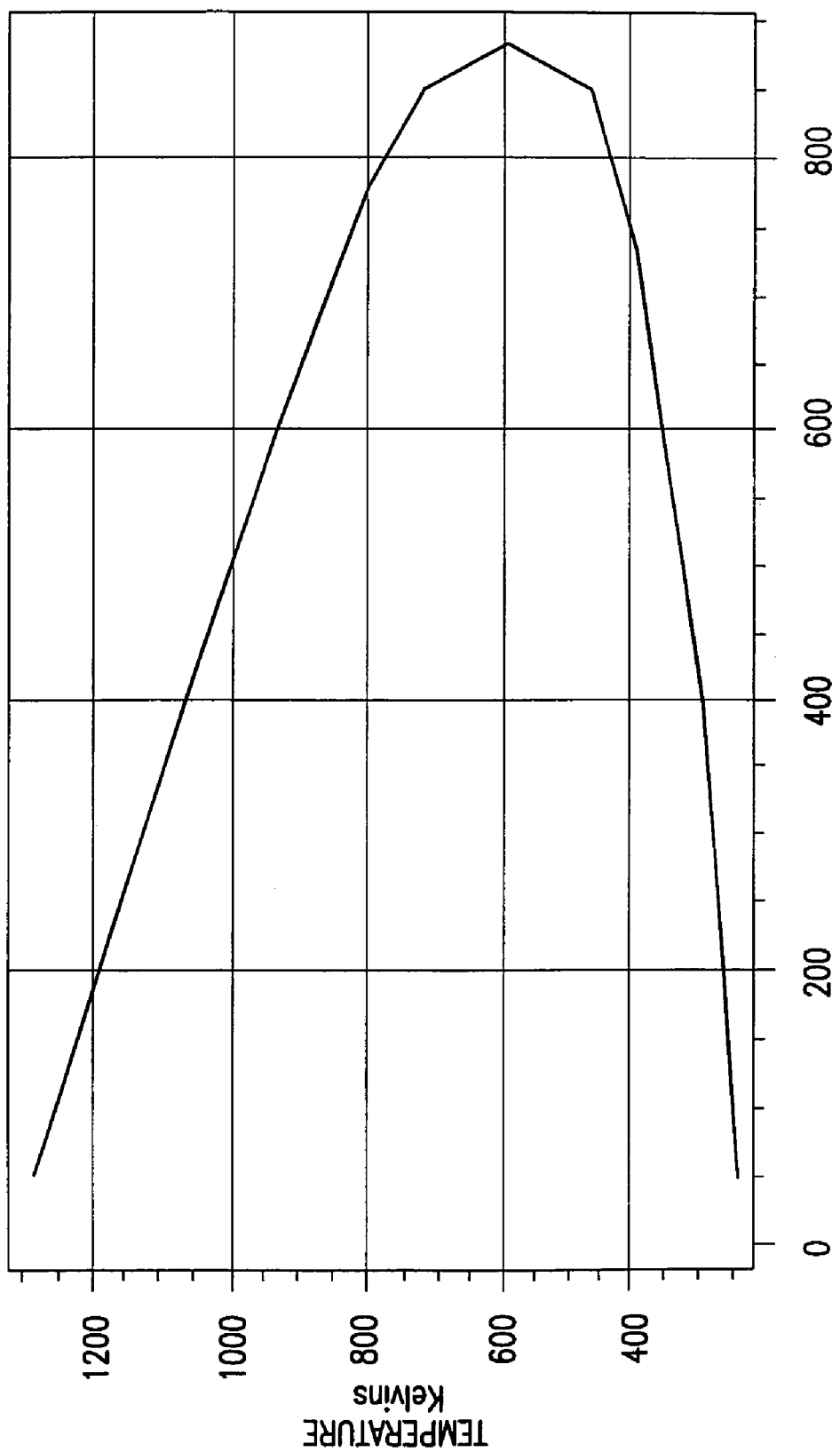
FIG. 5 is a graphical representation of inversion temperature as a function of temperature and pressure for carbon dioxide.

FIG. 5 is a graphical representation of the inversion temperature as a function of temperature and pressure for carbon dioxide. With operation within the area bound by the curve, the gas will cool in a Joule-Thomson expansion. With operation in the area outside the curve, the gas will heat in a Joule-Thomson expansion. Note that relatively high temperatures are normally required to achieve heating of the carbon dioxide gas.

Figure 6:
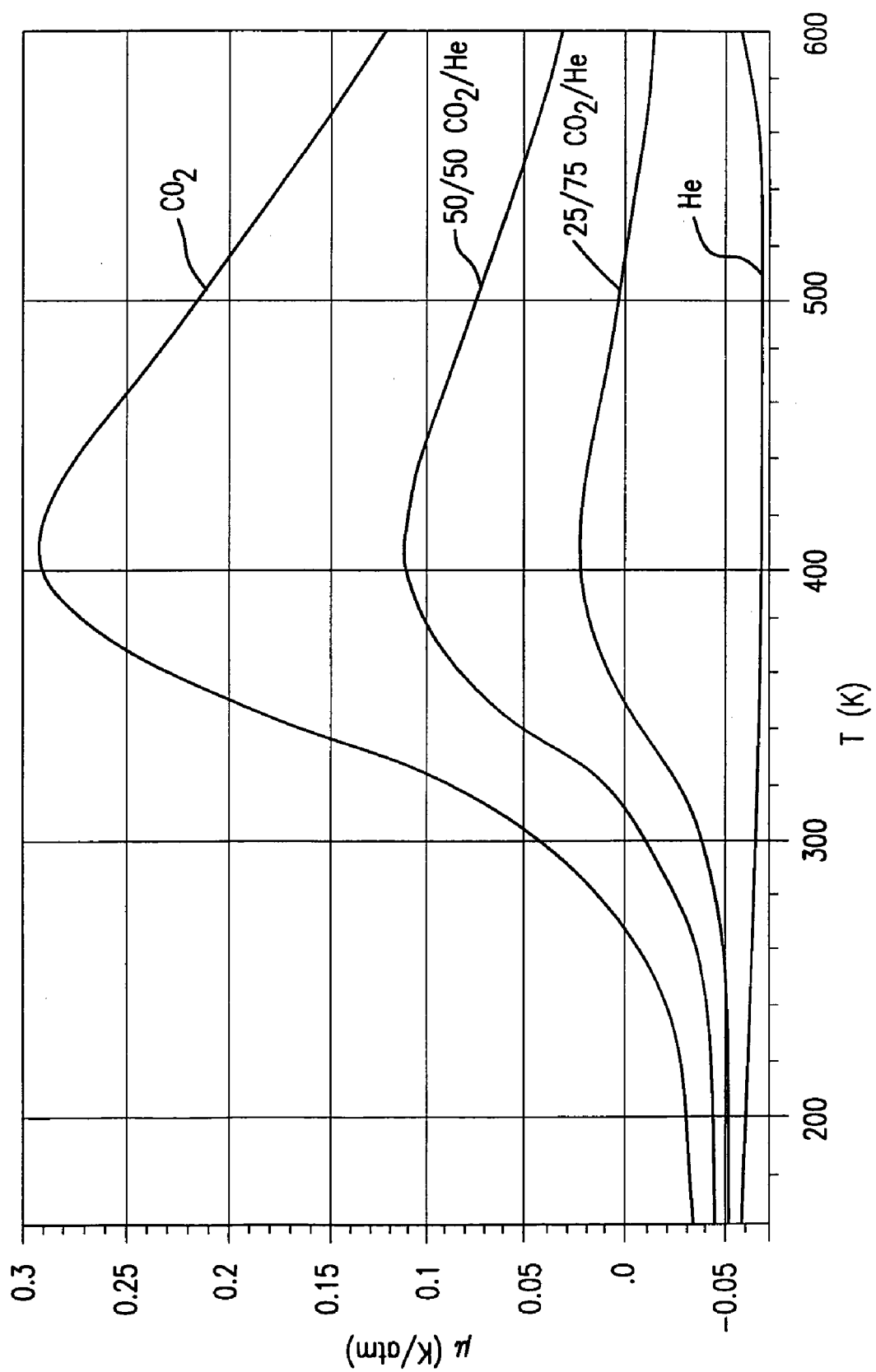
FIG. 6 is a graphical representation of the Joule-Thomson coefficient as a function of temperature (at 2940 psia) for $CO_2$ and He, as well as 25/75 and 50/50 molar mixtures of $CO_2$ and He.

FIG. 6 is a graphical representation of the Joule-Thomson coefficient (represented by the Joule-Thomson coefficient chemical thermodynamic symbol, $\mu$) as a function of temperature (in units of Kelvin, K), at 2940 psia (20.27 MPa), for $CO_2$ and He, as well as 25/75 and 50/50 molar mixtures of $CO_2$ and He. For $CO_2$ at the pressure of 2940 psia (20.27 MPa), the Joule-Thomson coefficient is generally only negative, i.e., less than zero, at low temperatures. Thus, $CO_2$ at this pressure will usually cool upon Joule-Thomson expansion. On the other hand, the Joule-Thomson coefficient of He is generally usually negative at the pressure of 2940 psia (20.27 MPa). Thus, He at the pressure of 2940 psia (20.27 MPa) will generally provide heat upon Joule-Thomson expansion. As the relative proportion of He in a He and $CO_2$ mixture is increased, the range of negative Joule-Thomson coefficient for the mixture is also generally increased. This illustrates that achieving negative Joule-Thomson coefficients for such mixtures is possible and that the range of negative Joule-Thomson coefficient values can be controlled as well.

Figure 7:
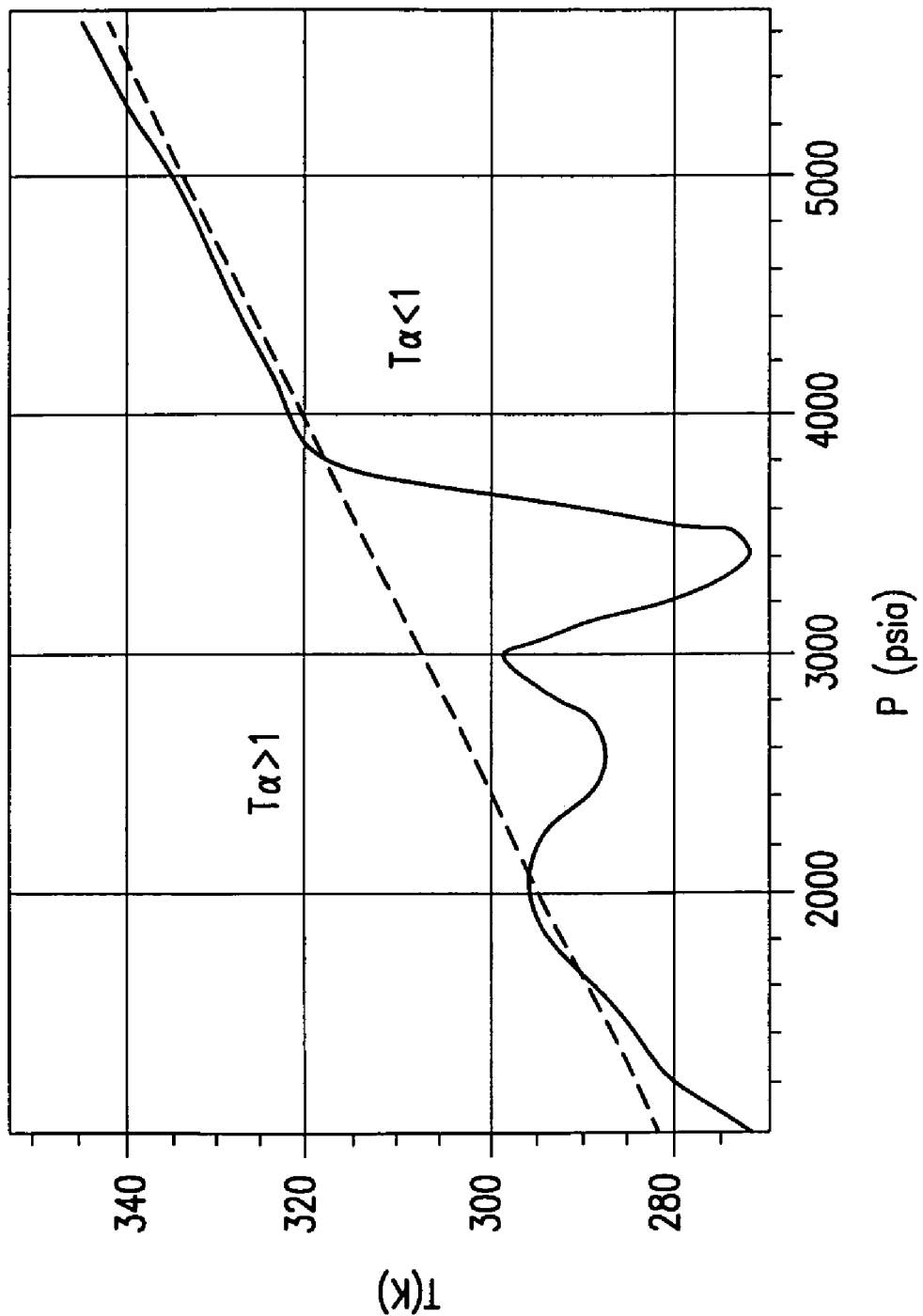
FIG. 7 is a graphical representation of inversion temperature as a function of temperature and pressure for a mixture of $N_2O/CO_2/He$ having a molar ratio of 20/70/10.

FIG. 7 is a graphical representation of the inversion temperature as a function of temperature and pressure for a mixture of $N_2O/CO_2$/He having a molar ratio of 20/70/10. The lower part of this inversion curve can typically be adequately approximated with a linear model. In FIG. 7, the dashed line is:

$$T=268+0.01335 \times P$$

The non-linear behavior of the plot shown in FIG. 7 is attributable to the higher order thermodynamic condition of state used in describing the behavior of this particular mixture. Those skilled in the art will appreciate that mathematical manipulation of such equations, particularly in regions characterized by sharp gradients in properties, can result in highly non-linear forms such as not strictly representative of the real behavior of the mixture.

From a review of FIG. 7 it will be appreciated that at temperatures and pressures commonly used for storage conditions in inflator devices used for inflating an inflatable device such as an inflatable vehicle occupant restraint of a respective inflatable restraint system, negative Joule-Thomson coefficients can be relatively easily achieved with such gas mixtures.

In view of the above, a wide range of inflator devices and methods for producing an inflation gas such as for inflating an inflatable safety restraint cushion, can be realized by following the teachings herein provided.

Thus, the invention provides inflation apparatus and methods of inflation gas production and supply which have one or more of a design, operation or construction which, at least for particular applications, is desirably either or both simpler and more effective than previously available. Further, the invention provides inflation apparatus and methods of inflation gas production and supply which can provide or result in an inflation gas output which can be adapted to particular or specific inflation applications in a simple and effective manner. In particular, the invention utilizes or employs Joule-Thomson heating in an advantageous manner to one or more simplify, facilitate, and/or improve inflation gas generation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable safety restraint cushion, the apparatus comprising:
    an expansion chamber having fluid contents;
    an expansion chamber opening device effective, upon actuation, to open the expansion chamber to permit passage of at least a portion of the expansion chamber contents therefrom for inflating the inflatable safety restraint cushion;
    a Joule-Thomson throttling device situated adjacent to the expansion chamber; and
    a storage chamber situated adjacent to the Joule-Thomson throttling device, opposite the expansion chamber, the storage chamber having contents including a supply of Joule-Thomson heating material;
    wherein, upon opening of the expansion chamber, the Joule-Thomson throttling device permits at least a portion of the supply of the Joule-Thomson heating material to be passed from the storage chamber to the expansion chamber through the Joule-Thomson throttling device with the portion of the supply of the Joule-Thomson heating material passing therethrough undergoing Joule-Thomson heating to form an inflation gas for use in inflating the inflatable safety restraint cushion.

2. The apparatus of claim 1 wherein the Joule-Thomson throttling device comprises a porous plug.

3. The apparatus of claim 1 wherein upon passage of at least a portion of the supply of the Joule-Thomson heating material through the Joule-Thomson throttling device, the Joule-Thomson throttling device is at least partially consumed.

4. The apparatus of claim 1 wherein the Joule-Thomson material comprises helium.

5. The apparatus of claim 1 wherein the Joule-Thomson material comprises $H_2$.

6. The apparatus of claim 1 wherein the Joule-Thomson material comprises helium and $H_2$.

7. The apparatus of claim 1 wherein the Joule-Thomson material comprises at least one fluid selected from the group consisting of: oxygen, argon, nitrogen, neon, xenon, $SF_6$, carbon monoxide, ammonia, hydrocarbon fuels and mixtures thereof.

8. The apparatus of claim 1 wherein the contents of the storage chamber are at a static pressure of at least 2500 psi (17.2 MPa) and no more than 15,000 psi (103.4 MPa).

9. The apparatus of claim 1 wherein the contents of the storage chamber are at an equivalence ratio of at least 0.05 and no more than 1.2.

10. The apparatus of claim 1 additionally comprising a barrier element preventing passage between the storage chamber and the expansion chamber when the apparatus is in an original static state.

11. The apparatus of claim 10 wherein the expansion chamber initially contains a supply of stored inflation material.

12. The apparatus of claim 10 wherein the expansion chamber additionally contains a heat source.

13. The apparatus of claim 10 wherein the storage chamber additionally contains a heat source.

14. The apparatus of claim 10 additionally comprising a storage chamber opening device, the storage chamber opening device, upon actuation, effective to open the storage chamber and permit passage therefrom of at least a portion of the supply of Joule-Thomson heating material without passage of such portion through the Joule-Thomson throttling device.

15. The apparatus of claim 14 additionally comprising a first heat source contained within the expansion chamber and a second heat source contained at least in part within the storage chamber.

16. The apparatus of claim 1 wherein the expansion chamber additionally contains a heat source.

17. The apparatus of claim 1 wherein;
    the storage chamber additionally contains a heat source;
    the apparatus additionally comprises a storage chamber opening device, the storage chamber opening device, upon actuation, effective to result in heat being transferred from the storage chamber heat source to the contents of the storage chamber and to open the storage chamber and permit passage therefrom of at least a portion of the supply of Joule-Thomson heating material without passage of such portion through the Joule-Thomson throttling device;
    the expansion chamber containing a supply of gas generant reactant material; and
    wherein at least a portion of the supply of gas generant reactant material is heated via contact with Joule-Thomson heating material having passed through the Joule-Thomson throttling device.

18. A method for producing an inflation gas for inflating an inflatable safety restraint cushion, the method comprising:
    passing at least a portion of a supply of Joule-Thomson heating material through a Joule-Thomson throttling device contained in an inflator assembly whereby the portion of the supply of the Joule-Thomson heating material passing therethrough undergoes Joule-Thomson heating to form an inflation gas for use in inflating the inflatable safety restraint cushion.

19. The method of claim 18 wherein the Joule-Thomson throttling device comprises a porous plug.

20. The method of claim 18 wherein upon passage of at least a portion of the supply of the Joule-Thomson heating material through the Joule-Thomson throttling device, the Joule-Thomson throttling device is at least partially consumed.

21. The method of claim 18 wherein the Joule-Thomson material comprises helium.

22. The method of claim 18 wherein the Joule-Thomson material comprises $H_2$.

23. The method of claim 18 wherein the Joule-Thomson material comprises helium and $H_2$.

24. The method of claim 18 wherein the Joule-Thomson material comprises at least one fluid selected from the group consisting of: oxygen, argon, nitrogen, neon, xenon, $SF_6$, carbon monoxide, ammonia, hydrocarbon fuels and mixtures thereof.

25. The method of claim 18 wherein prior to said passing, the at least a portion of a supply of Joule-Thomson heating material is contained within the inflator device in a storage chamber.

26. The method of claim 25 wherein the storage chamber has contents at a static pressure of at least 2500 psi (17.2 MPa) and no more than 15,000 psi (103.4 MPa).

27. The method of claim 25 wherein the storage chamber has contents at an equivalence ratio of at least 0.05 and no more than 1.2.

28. The method of claim 25 additionally comprising, prior to said passing step, the step of opening a barrier element to permit the passing of at least a portion of a supply of Joule-Thomson heating material through the Joule-Thomson throttling device from the storage chamber.

29. The method of claim 25 additionally comprising heating the Joule-Thomson heating material prior to passage through the Joule-Thomson throttling device.

30. The method of claim 18 additionally comprising heating the Joule-Thomson heating material after passage through the Joule-Thomson throttling device.

* * * * *